April 12, 1927.

E. R. BURTNETT

INTERNAL COMBUSTION ENGINE

Filed May 31, 1923

Inventor:
EVERETT R. BURTNETT.
BY Martin P. Smith
Attorney.

Patented Apr. 12, 1927.

1,624,581

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed May 31, 1923. Serial No. 642,507.

My invention relates to a two stroke cycle internal- internal combustion engine of the air cooled type, and one of the principal objects of my invention is to provide an engine having four combustion cylinders that are disposed so that they are clear of each other on a stepped circumferential line, and consequently providing a cylinder arrangement wherein a direct draft of cooling air from a fan or blower will impinge against a flow over each cylinder, consequently exerting equal cooling effect upon said cylinder.

Further objects of my invention are to provide a two stroke cycle internal combustion engine, each having four combustion cylinders, each of the four cylinders forming a pair to one compression clearance, to provide an engine wherein valveless charge functioning is obtained, to provide a construction wherein the pairs of cylinders are radially arranged with relation to each other so as to permit the pistons of each pair of cylinders and the connecting means to be connected to one crank throw, the radial arrangement of the cylinders with pistons connected to one crank throw facilitating the operation of one cylinder of each pair in advance of the second cylinder to the said pair of cylinders, to whatever extent the axes of the cylinders are arranged in angular degrees, thus permitting the advance cylinder to serve for the exhaust functions and providing for the exhaust port opening lead, in timing over the inlet port opening that is functioned by the second piston in the second cylinder of the said pair of cylinders; further to arrange the cylinders of each pair so that their centers are in line with the center of the crank throw to which the pistons of said cylinders are connected, which arrangement permits a very close assembly and compact structure endwise, to provide a structure wherein the cylinders forming the second pair are radially disposed to the side of the first pair of radially arranged cylinders and having their pistons connected to a second throw of the crank shaft, the latter being arranged 180 degrees from the first crank throw so as to provide for the opposite internal time function to occur within each pair of cylinders and consequently providing a two power impulse revolution cycle.

A further object of my invention is to arrange the inlet and exhaust manifolds in the crank case casting, thus providing a very neat and substantial structure that may be easily and cheaply produced.

A still further object of my invention is to provide an internal combustion engine designed so that its cylinders are uniformly and directly air cooled and to eliminate the undesirable features that are conventional in present engine practice viz, that development of cylinder and compression chamber-wall hot spots and which latter result in irregular cylinder temperatures and disturbs the rhythmic working order of compression and combustion in internal combustion engines.

With the foregoing and other objects in view, my invention consists in certain novel features of construction and arrangement of parts that will be hereinafter more fully described and claimed and illustrated in the accompanying drawings in which Fig. 1 is a vertical section taken lengthwise through the center of a pair of the connected cylinders of my improved engine.

Figure 1:
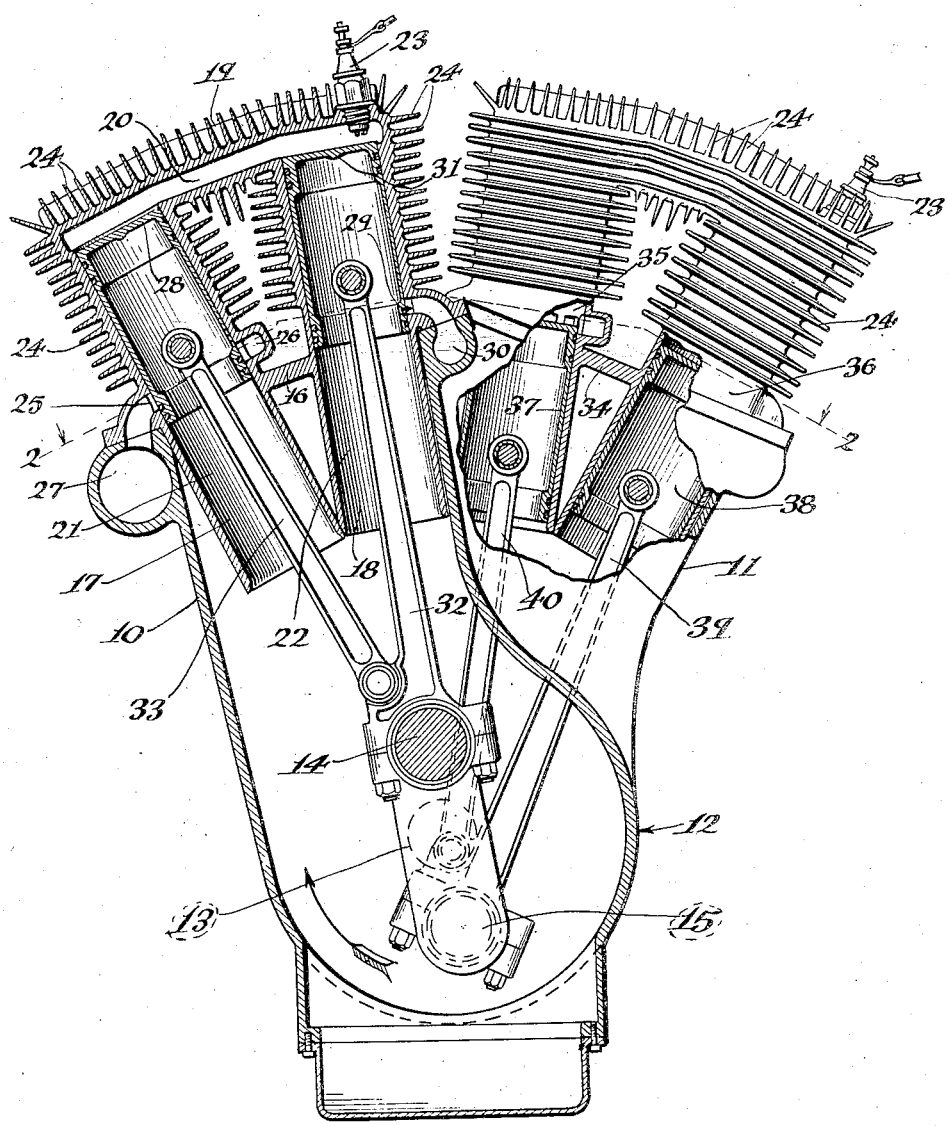
Figure 2:
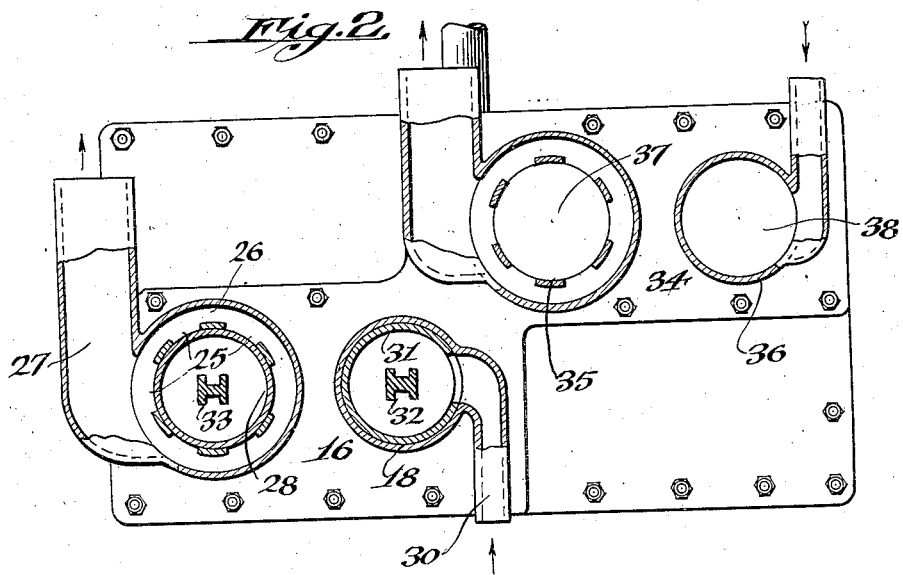
Fig. 2 is a horizontal section taken approximately on the line 2—2 of Fig. 1.
Figure 3:
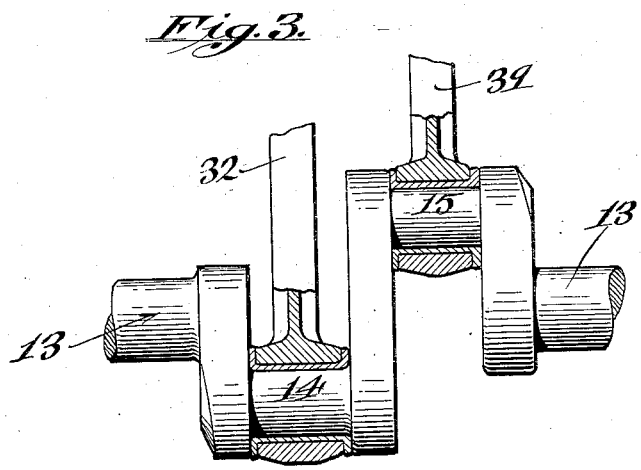
Fig. 3 is an elevational view of the crank shaft of the engine.

Referring by numerals to the accompanying drawings 10 and 11 designate the hollow legs of a substantially V-shaped structure and the lower portions of said legs are joined by a housing 12 that serves as the crank case proper.

The end walls of the housing or crank case 12 are provided with suitable bearings for shaft 13 having two cranks, 14 and 15 that are arranged directly opposite to each other, or 180 degrees apart.

The legs or upper parts 10 and 11 of the crank case are radially disposed relative to the axis of the crank shaft 13 and said legs or members are offset with respect to each other lengthwise of said crank shaft.

Secured in position on top of leg or member 10 is a plate 16 and formed integral therewith is a pair of combustion cylinders 17 and 18.

These cylinders occupy angular positions with respect to each other so that their axes are radially arranged relative to crank shaft 13.

The upper ends of the cylinders are connected by an integrally formed head 19, and the chamber 20 within said head connects the upper portions of the chambers 21 and 22 that are formed in cylinders 17 and 18 respectively, thereby producing a common compression, combustion and expansion clearance or chamber.

Seated at a suitable point in the head 19, preferably above the chamber 22 in cylinder 18 is an ignition device such as a spark plug 23.

Formed integral with the upper portions of the cylinders 17 and 18, and with the walls of head 19 are exteriorly arranged heat radiating fins 24.

Formed through the intermediate portion of the wall of cylinder 17 is a series of exhaust ports 25 that all communicate with an annular chamber 26 and the latter communicates with a relatively large exhaust duct 27 that is formed integral with the upper portion of crank case member 10.

These exhaust ports are located in the cylinder 17 so that they are wholly uncovered and open, only when piston 28 that reciprocates within said cylinder is at the lower or outer end of its travel.

Formed through the intermediate portion of the wall of cylinder 18 is a series of inlet ports 29, that communicate with a duct 30 that is formed in the upper portion of crank case member 10 and said duct being connected to a suitable source of gaseous fuel supply and the latter preferably being under pressure.

The gaseous fuel inlet ports 29 are located in cylinder 18 so that they are wholly uncovered and open only when piston 31 that reciprocates within said cylinder is at the lower or outer end of its stroke.

A rod or pitman 32 connects piston 31 to crank 14, and a rod or pitman 33 connects piston 28 to the lower portion of said rod 32.

Due to the angularity of cylinders 17 and 18 with respect to each other and the distance beeween the axis of crank 14 and the axis of the pivotal connection between rods 32 and 33, piston 28 travels a slight degree in advance of piston 31, consequently exhaust ports 25 are opened and closed slightly in advance of the opening and closing of the gaseous fuel inlet ports 29.

The upper end of crank case member 11 is closed by a plate 34 that is a duplicate of plate 16 and formed integral with said plate are combustion cylinders 35 and 36 that are identical in size, form and construction with cylinders 17 and 18.

This second pair of combustion cylinders occupy a transverse plane that is offset relative to the plane occupied by cylinders 17 and 18 and, in addition, the cylinders 35 and 36 are offset circumferentially in relation to the cylinders 17 and 18, and the axis of crank shaft 13.

As a result of this arrangement, the upper portions of all of the cylinders or those portions that are provided with heat radiating fins are equally exposed and a blast of air directed by a fan or blower lengthwise of the engine structure will exert uniform cooling effect upon all four cylinders.

Cylinder 35 is provided with exhaust ports and cylinder 36 is provided with gaseous fuel inlet ports.

Pistons 37 and 38, that are identical with pistons 28 and 31, are arranged for operation in cylinders 35 and 36 and connecting piston 38 with crank 15 is a connecting rod or pitman 39.

A connecting rod 40 connects piston 37 to the lower portion of rod 39.

Thus the legs or crank case members 10 and 11 and the parts supported and contained thereby constitute two separate engine units, the four combustion cylinders of the two units equally exposed to a cooling blast, with the two pistons of each unit connected to a single crank throw and with the two cranks or throws, arranged 180 degrees apart, so that when one pair of pistons are at their upper or inner ends of their strokes, the pistons of the other pair are at the lower or outer ends of their strokes.

As crank 14 passes high center or immediately thereafter a spark produced by plug 23 ignites the charge of gaseous fuel that is under high compression within common clearance chamber 20 and the expansion following combustion drives the pistons downward upon their power stroke.

Inasmuch as piston 28 travels slightly in advance of piston 31, the exhaust ports 25 will be uncovered an instant before inlet ports 29 are uncovered as pistons 28 and 29 approach and reach the lower ends of their strokes.

This lead in opening the exhaust ports permits the internal pressure to drop an instant before the admission of the fresh charge of gaseous fuel (under pressure) through ports 29.

Thus while the pistons 28 and 29 are at the lower ends of their travel, the fresh charge of gaseous fuel entering ports 29 forces the burnt products of combustion from the common chamber within cylinder 18, head 19, and cylinder 17 and through exhaust ports 25, as long as the latter are open.

After the inlet and exhaust ports have been closed by the upwardly moving pistons, the gaseous fuel volume that occupies the common chamber in the cylinders and head, is compressed above said pistons into chamber 20, until the pistons pass their high centers, whereupon the compressed charge is ignited, to again drive said pistons downward on the power stroke.

Thus it will be seen that I have provided a two stroke cycle internal combustion engine that is of simple, strong and substantial structure, of relatively short overall length, the arrangement being such that the crank shaft receives two power impulses during each complete rotation and the combustion cylinders being arranged so that they are all equally exposed to a blast of cooling air from a fan or the like.

Various minor changes in the size, form and construction of the various parts of my improved internal combustion engine may be made and substituted for those herein described without departing from the spirit of my invention, the scope of which is set forth in the appended claims.

I claim as my invention:

1. In a two stroke cycle internal combustion engine, four combustion cylinders arranged in two pairs, the head ends of the chambers within the members of the respective pairs of cylinders being connected by common compression and combustion clearance chambers thereby forming two dual cylinder combustion chambers, the four cylinders being disposed in different radial planes having a common center, one pair of cylinders occupying one circumferential plane, the other pair of cylinders occupying another circumferential plane and the four cylinders being spaced apart circumferentially so that the entire front and side portions of the four cylinders are wholly exposed to air drafts that are directed rearwardly from the forward end of the engine.

2. In a two stroke cycle internal combustion engine, four combustion cylinders arranged in two pairs, the head ends of the chambers within the members of the respective pairs of cylinders being connected by common compression and combustion clearance chambers thereby forming two dual cylinder combustion chambers, the four cylinders being disposed in different radial planes having a common center, one pair of cylinders occupying one circumferential plane, the four cylinders being spaced apart circumferentially so that the entire front and side portions of the four cylinders are wholly exposed to air drafts that are directed rearwardly from the forward end of the engine and heat radiating fins formed on the exposed portions of all of the cylinders and on the walls surrounding the common compression and combustion clearance chambers.

3. In a two stroke cycle internal combustion engine, four combustion cylinders arranged in two pairs, the head ends of the chambers within the members of the respective pairs of cylinders being connected by common compression and combustion clearance chambers thereby forming two dual cylinder combustion chambers, the four cylinders being disposed in different radial planes having a common center, one pair of cylinders occupying one circumferential plane, the other pair of cylinders occupying another circumferential plane, the four cylinders being spaced apart circumferentially so that the entire front and side portion of the four cylinders are wholly exposed to air drafts that are directed rearwardly from the forward end of the engine, a crank shaft having two throws disposed 180° apart, the axis of which crank shaft is intersected by the axes of the four cylinders, pistons arranged for operation within the four cylinders and connections between the two pistons in each pair of cylinders and the respective one of the two crank throws of said crank shaft.

In testimony whereof I affix my signature.

EVERETT R. BURTNETT.